US010618155B2

(12) United States Patent
Moore et al.

(10) Patent No.: US 10,618,155 B2
(45) Date of Patent: Apr. 14, 2020

(54) FASTENER-DRIVING TOOL WITH AN ELECTRIC POWER GENERATOR

(71) Applicant: Illinois Tool Works Inc., Glenview, IL (US)

(72) Inventors: Stephen P. Moore, Palatine, IL (US); Hanxin Zhao, Northbrook, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 220 days.

(21) Appl. No.: 15/589,454

(22) Filed: May 8, 2017

(65) Prior Publication Data

US 2017/0239800 A1 Aug. 24, 2017

Related U.S. Application Data

(63) Continuation of application No. 14/250,901, filed on Apr. 11, 2014, now Pat. No. 9,676,090, which is a (Continued)

(51) Int. Cl.
*B25C 7/00* (2006.01)
*H02K 35/02* (2006.01)
(Continued)

(52) U.S. Cl.
CPC ............... *B25C 7/00* (2013.01); *B25C 1/042* (2013.01); *B25C 1/047* (2013.01); *H02K 7/1823* (2013.01); *H02K 7/1876* (2013.01); *H02K 35/02* (2013.01)

(58) Field of Classification Search
CPC .......... B25C 7/00; B25C 1/042; B25C 1/047; H02K 7/1823; H02K 7/1876; H02K 35/02
(Continued)

(56) References Cited

U.S. PATENT DOCUMENTS 3,924,789 A   12/1975  Avery
3,982,678 A *  9/1976  Olson .................... B25C 1/003
                                                    227/63
(Continued)

FOREIGN PATENT DOCUMENTS

DE          10327191       12/2004
DE        102004010319      8/2005
(Continued)

OTHER PUBLICATIONS

European Office Action for European Application No. 13 734 911.4, dated Feb. 12, 2018 (5 pages).
(Continued)

*Primary Examiner* — Nathaniel C Chukwurah
(74) *Attorney, Agent, or Firm* — Neal, Gerber & Eisenberg LLP

(57) ABSTRACT

A fastener-driving tool including a housing having an air connector, at least one of a power storage device and an electrical component associated with the housing and an electric motor assembly associated with the housing. The electric motor assembly includes a fan where air is supplied to the housing through the air connector and moves through the housing and contacts the fan to cause the fan to rotate, rotation of the fan causing the electric motor to generate electricity that is directed to the at least one power storage device and the electrical component.

19 Claims, 12 Drawing Sheets

Related U.S. Application Data continuation-in-part of application No. 13/796,255, filed on Mar. 12, 2013, now abandoned.

(60) Provisional application No. 61/662,737, filed on Jun. 21, 2012.

(51) Int. Cl.
*H02K 7/18* (2006.01)
*B25C 1/04* (2006.01)

(58) Field of Classification Search
USPC ............ 173/46; 227/8, 130, 9, 10, 11
See application file for complete search history.

(56) References Cited

U.S. PATENT DOCUMENTS

| | | | |
|---|---|---|---|
| 4,215,808 A * | 8/1980 | Sollberger | B25C 1/041 |
| | | | 173/204 |
| 4,522,162 A | 6/1985 | Nikolich | |
| 4,807,793 A * | 2/1989 | Ghibely | B25C 5/15 |
| | | | 227/131 |
| 4,990,852 A * | 2/1991 | Kirkland | G01V 3/10 |
| | | | 324/326 |
| 5,525,842 A | 6/1996 | Leininger | |
| 5,732,870 A | 3/1998 | Moorman | |
| 6,843,401 B2 | 1/2005 | Favre-Bulle | |
| 6,997,367 B2 * | 2/2006 | Hu | B25C 1/06 |
| | | | 173/202 |
| 7,513,407 B1 * | 4/2009 | Chang | B25C 1/06 |
| | | | 173/202 |
| 2002/0158102 A1 | 10/2002 | Patton et al. | |
| 2003/0015088 A1 | 1/2003 | Wursch | |
| 2005/0001000 A1 | 1/2005 | Favre-Bulle et al. | |
| 2005/0078799 A1 | 4/2005 | Ancelin et al. | |
| 2006/0180631 A1 * | 8/2006 | Pedicini | B25C 1/06 |
| | | | 227/130 |
| 2007/0008162 A1 | 1/2007 | Gossett | |
| 2007/0059186 A1 | 3/2007 | Weaver et al. | |
| 2007/0215667 A1 * | 9/2007 | Huang | B25C 1/06 |
| | | | 227/11 |
| 2008/0185418 A1 | 8/2008 | Gross | |
| 2008/0190988 A1 | 8/2008 | Pedicini | |
| 2008/0272170 A1 | 11/2008 | Huang | |
| 2008/0314952 A1 | 12/2008 | Tamura | |
| 2009/0090759 A1 | 4/2009 | Leimbach | |
| 2010/0032468 A1 | 2/2010 | Gross | |
| 2010/0200260 A1 | 8/2010 | Mikami | |
| 2011/0068142 A1 | 3/2011 | Webb | |
| 2011/0303733 A1 | 12/2011 | Fielitz | |
| 2012/0097730 A1 | 4/2012 | Liang | |
| 2013/0087108 A1 | 4/2013 | Gschwend | |
| 2013/0336809 A1 | 12/2013 | Antoun | |
| 2014/0054350 A1 | 2/2014 | Pedicini | |

FOREIGN PATENT DOCUMENTS

| | | |
|---|---|---|
| EP | 1 071 195 | 1/2001 |
| EP | 2 243 600 | 10/2010 |
| FR | 2847501 | 5/2004 |
| WO | WO 2011/125931 | 10/2011 |
| WO | WO 2013/053002 | 4/2013 |

OTHER PUBLICATIONS

International Search Report from International Patent Application No. PCT/US2015/019134 dated Jun. 19, 2015.
International Search Report and Written Opinion for International Application No. PCT/US2013/047025, dated Jan. 7, 2014 (9 pages).

* cited by examiner

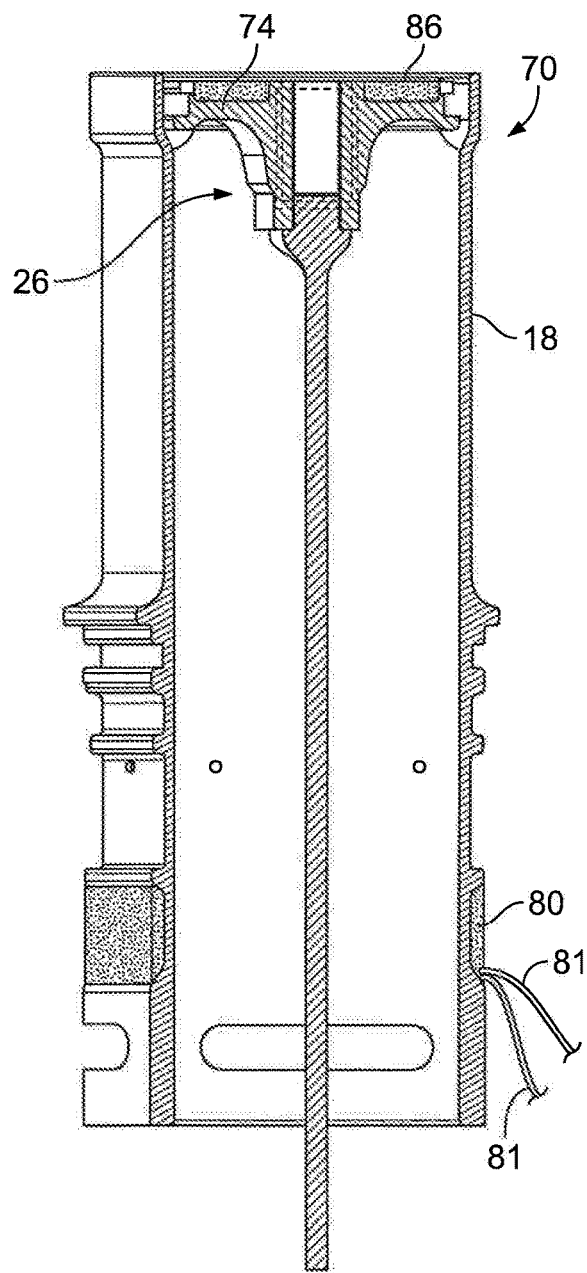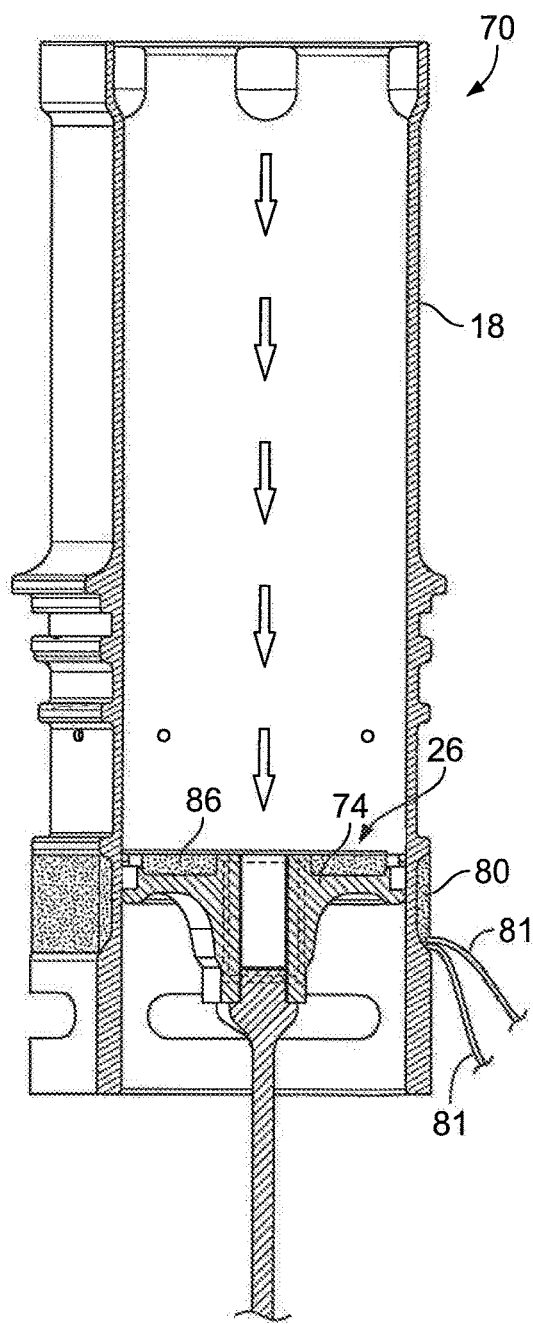
FIG. 7
FIG. 8

FASTENER-DRIVING TOOL WITH AN ELECTRIC POWER GENERATOR

PRIORITY CLAIM

This patent application is a continuation of and claims priority to and the benefit of U.S. patent application Ser. No. 14/250,901, which was filed on Apr. 11, 2014, which is a continuation-in-part of and claims priority to and the benefit of U.S. patent application Ser. No. 13/796,255, which was filed on Mar. 12, 2013, and is abandoned, which claims priority to and the benefit of U.S. Provisional Patent Application No. 61/662,737, which was filed on Jun. 21, 2012, the entire contents of each of which are incorporated herein by reference.

BACKGROUND

The present invention relates generally to fastener-driving tools, and particularly to such tools being powered electrically, by compressed gas, combustion or powder.

Powered fastener-driving tools, and particularly those using compressed air as an energy source, incorporate a housing enclosing a cylinder. Slidably mounted within the cylinder is a piston assembly in communication on one side with a supply chamber and a return chamber on the opposite side thereof The piston assembly includes a piston head and a rigid driver blade that is disposed within the cylinder. A movable valve plunger is oriented above the piston head. In its at-rest position this valve plunger prevents the drive chamber from communicating to the piston assembly and allows an air flow path to atmosphere above the piston assembly. In its actuated state, the valve plunger prevents or blocks the air flow path to atmosphere and allows an air flow path to the drive chamber When a tool's actuation requirements have been met, the movable valve plunger opens and exposes one side of the piston assembly to a compressed gas energy source. The resulting pressure differential causes the piston and driver blade to be actuated downward to impact a positioned fastener and drive it into a workpiece. Fasteners are fed into the nosepiece from a supply assembly, such as a magazine, where they are held in a properly positioned orientation for receiving the impact of the driver blade.

As the piston is actuated downward, it drives the air inside the cylinder through a series of vents into the return chamber increasing the pressure in this chamber. After the fastening event has taken place, the valve plunger moves back to the at-rest position, blocking the supply chamber's air flow path to the piston head and releasing the pressure above the piston head through the path to atmosphere. At this time, the pressure built in the return chamber pushes the piston assembly back up towards the top of the cylinder. The air above the piston head is forced through the valve plunger's air flow path to atmosphere.

Other fastener-driving tools operate similarly in that a reciprocating driver blade drives fasteners fed to a nosepiece by a biased magazine. The power source varies, with combustion, electric and powder operated tools being well known in the art.

Several of the controls and indicators for fastener-driving tools are powered by internal electrical circuitry and power sources such as batteries. The operation of the fastener-driving tools and thereby the controls and indicators in these tools, depletes the power stored in the internal power sources.

SUMMARY

The foregoing and other objectives are achieved in accordance with the teachings and principles of the present invention through the provision of a fastener-driving tool having an electrical generator for generating electricity to power different components of the tool.

In an embodiment, a fastener-driving tool is provided and includes a housing having an air connector, at least one of a power storage device and an electrical component associated with the housing and an electric motor assembly associated with the housing. The electric motor assembly includes a fan where air is supplied to the housing through the air connector and moves through the housing and contacts the fan to cause the fan to rotate, rotation of the fan causing the electric motor to generate electricity that is directed to the at least one power storage device and the electrical component.

In another embodiment, a fastener-driving tool is provided and includes a housing having a pressurized air connector, a processor associated with the housing, at least one of a power storage device and an electrical component associated with the housing and an electric motor assembly associated with the housing and in communication with the processor, where the electric motor assembly includes a fan. Pressurized air is supplied to the housing through a pressurized air connector on the housing and contacts the fan to cause the fan to rotate. Rotation of the fan causes the electric motor to generate electricity that is directed to the at least one power storage device and the electrical component by the processor.

In a further embodiment, a fastener-driving tool is provided and includes a housing defining a drive channel and a driver blade reciprocally movable in the drive channel between a pre-drive position and a post-drive position, where a side of the driver blade includes a plurality of blade teeth. A drive gear is rotatably mounted in the housing and positioned adjacent to the drive channel, where the drive gear includes a plurality of drive teeth. Also, an electric motor assembly including a drive shaft is coupled to the drive gear where when the driver blade moves from the pre-drive position to the post-drive position, the blade teeth engage the gear teeth to rotate the drive gear and the drive shaft causing the electric motor assembly to generate electricity for use in the tool.

BRIEF DESCRIPTION OF THE FIGURES

FIG. 7 is a vertical section of the piston assembly of FIG. 3 showing the piston at the top of the cylinder.

FIG. 8 is a vertical section of the piston assembly of FIG. 3 showing the piston at the bottom of the cylinder.

DETAILED DESCRIPTION

The present invention relates generally to powered, fastener-driving tools, wherein the tools may be electrically powered, pneumatically powered, combustion powered, or powder activated, and more particularly to a powered fastener-driving tool including an electrical generator configured to generate electricity to be used by other components of the tool and/or stored in a storage device or a plurality of storage devices, such as one or more internal or rechargeable batteries for use during operation of the tool.

Figure 1:
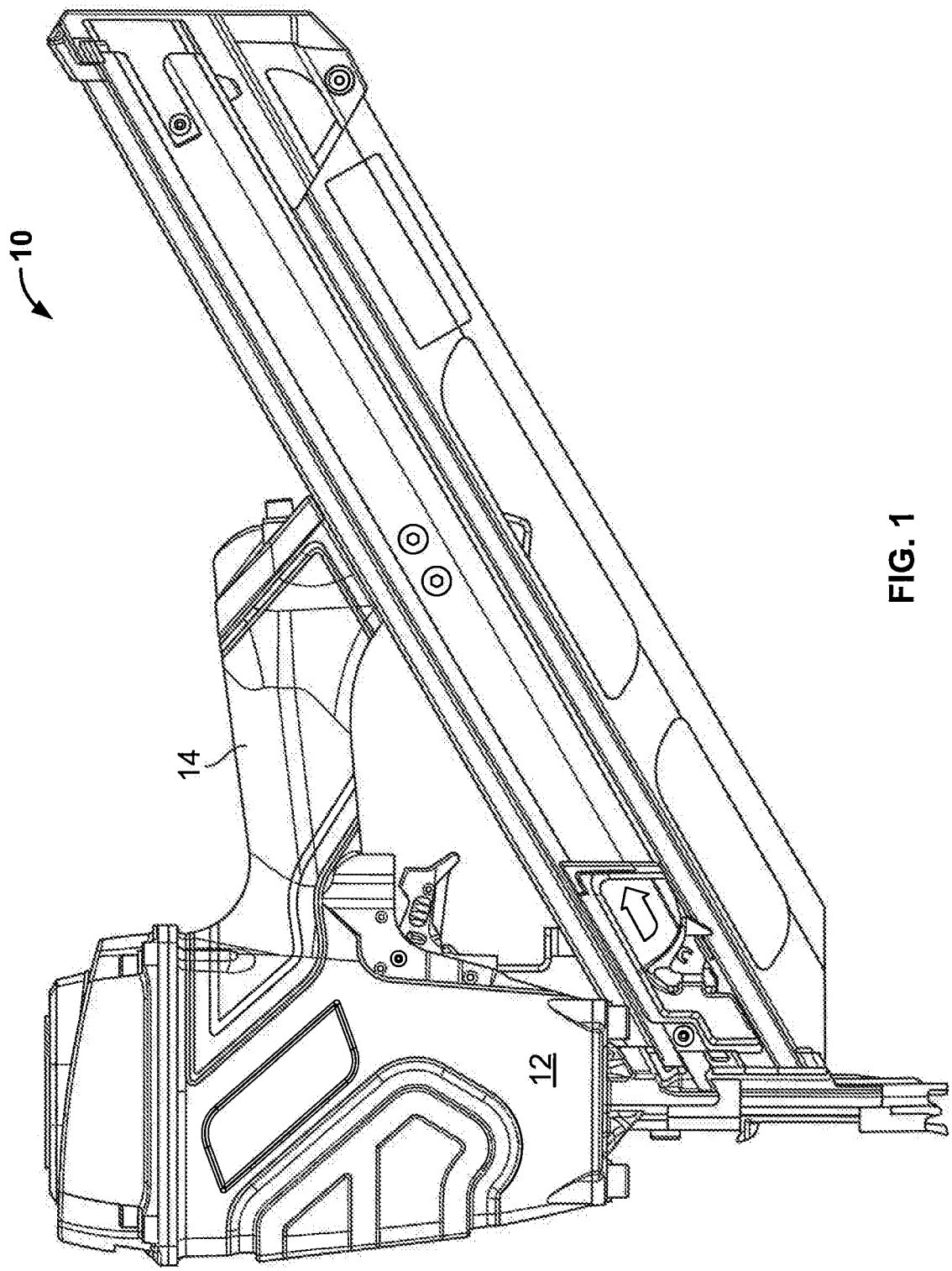
FIG. 1 is a side perspective view of a pneumatic fastening tool in accordance with one example embodiment of the present invention.
Figure 2:
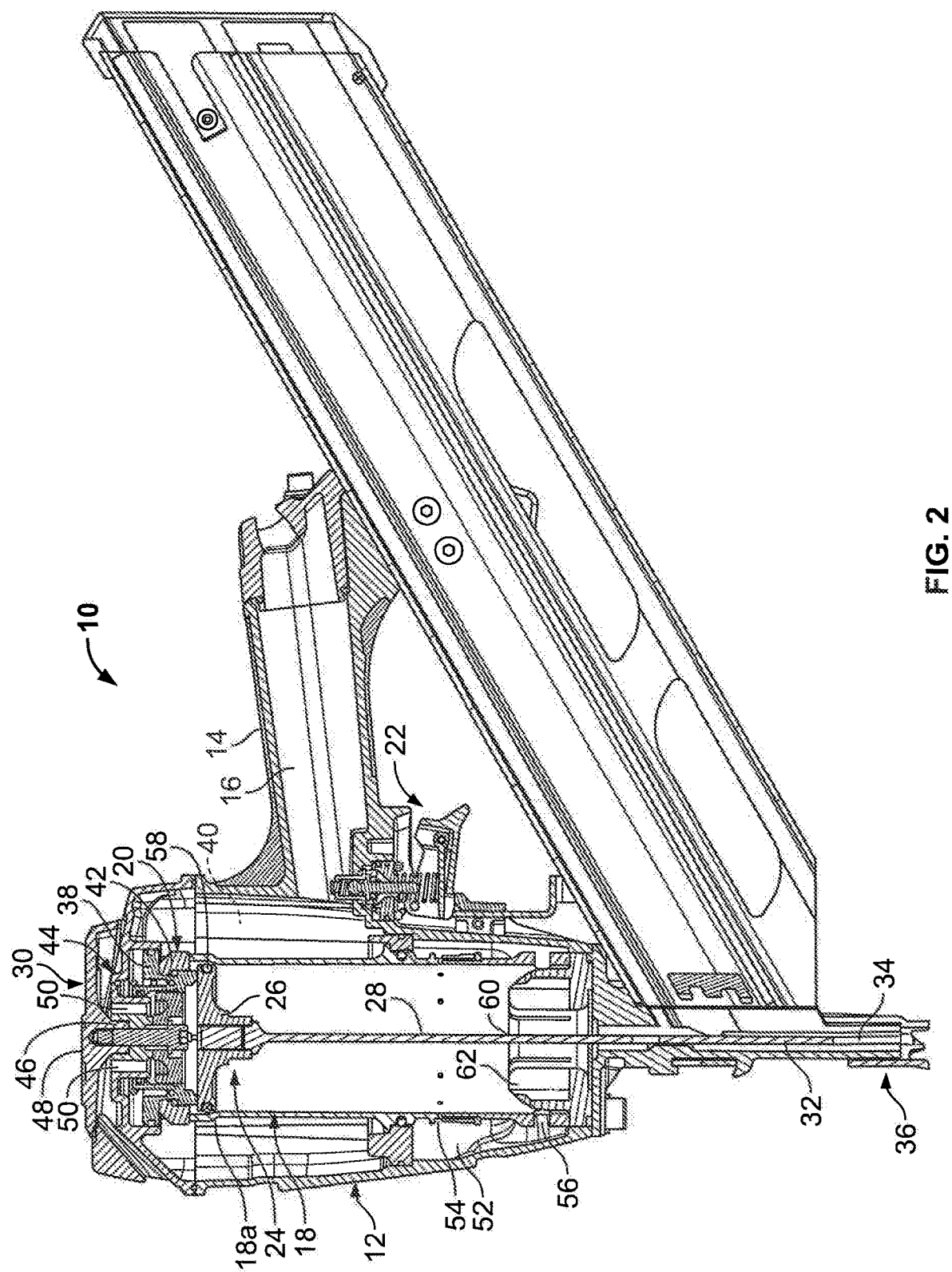
FIG. 2 is a fragmentary side vertical section of the pneumatic fastening tool of FIG. 1.

Referring now to FIGS. 1 and 2, an example of a fastener-driving tool of the present invention is illustrated where the fastener-driving tool is a pneumatic powered fastener-driving tool generally illustrated as 10. The fastener-driving tool 10 embodies a control valve assembly and bumper arrangement according to the present invention. The tool 10 may be of known construction, and, as illustrated, comprises a housing 12 including a generally vertically extending head or forward portion and a rearwardly extending hollow handle 14 having a cavity defining a fluid reservoir 16. Pressurized fluid such as compressed air is supplied to the fluid reservoir 16 of the tool by a suitable flexible line. The drive system for the tool 10 includes a main or power cylinder 18 mounted within the head portion of the housing 12 and having an open upper end 18a that is adapted to be selectively connected to the reservoir 16. The open upper end of the cylinder 18 is in engagement with a main or cylinder valve assembly 20 of a known type, under the control of a control valve assembly 22 according to the present invention. A fastener-driving assembly 24 slidably mounted in the cylinder 18 includes a main or drive piston 26 and has connected thereto a depending drive blade member 28. The fastener-driving assembly 24 is normally biased to a position with the piston 26 adjacent the cylinder valve assembly 20. An exhaust valve assembly indicated generally as 30 is provided for controlling the selective connection of the upper end of the cylinder 18 to the atmosphere.

When the tool 10 is to be operated, compressed fluid from the reservoir 16 enters the upper open end 18a of the cylinder 18 and drives the fastener-driving assembly 24 downwardly to engage and set a fastener or nail 32 supplied to a drive track 34 in a nosepiece or nosepiece structure 36. The flow of compressed fluid in the upper end of the cylinder 18 is controlled by the main valve assembly 20, which includes a vertically movable ring member 38 defining a valve element. The cylinder side of the ring member 38 is continuously in communication with the fluid reservoir 16 through a suitable passageway 40 so that pressurized fluid continuously acts against the cylinder side of the ring member 38 tending to displace the ring member 38 from the upper end or edge 18a of the cylinder 18. However pressurized fluid is also introduced to the opposite side of the ring member 38 through a passageway while the fastener-driving tool 10 is in a static or at rest position. The differential pressure acting on the ring member 38 is effective to maintain the ring member 38 down, in a closed position, with a sealing ring 42 against the upper end 18a of the cylinder 18. However if the pressurized fluid above the ring member 38 is discharged, the pressurized fluid acting through the passageway 40 is effective to unseat the ring member 38 from the upper end or edge 18a of the cylinder 18 to dump pressurized fluid into the top of the main cylinder 18 and to drive the drive piston 26 through the drive stroke.

When the fastener-driving tool 10 is at rest, or during the return stroke of the drive piston 26, the upper open end of the cylinder 18 is exhausted to the atmosphere through the exhaust valve assembly 30. In the illustrated embodiment the exhaust valve assembly 30 includes a valve member 44 spaced below an inner surface of a downwardly projecting boss 46 defined in a cap 48 of the tool 10. The cap 48 has a plurality of exhaust passageways 50 providing for the exhaust of the fluid when the ring member 38 is in its downward position.

To provide for the return stroke of the fastener-driving assembly 24, there is provided a return air chamber 52 communicating with the lower end of the cylinder 18 through a plurality of fluid inlet ports 54 and a plurality of fluid outlet ports 56.

Moreover the drive piston 26 is provided with at least one O-ring 58 for sealing the drive piston relative to an inner surface of the cylinder 18.

Thus, it will be understood that in the normal operation of the fastener-driving tool 10, the working fluid above the piston 26 will flow through the fluid inlet ports 54 into the return air chamber 52, and will thereafter flow through the fluid outlet ports 56 below the piston 26 to drive the piston 26 back through its return stroke. The fluid pressure drop should be less through the port beneath the piston than above, otherwise it will not be displaced sufficiently, blocking ports 54 and allowing the full return stroke. A greater volume of fluid will exit from chamber 52 to the bottom of the driver thus shifting it upwardly and closing off flow from passage 62 to above the driver and to atmosphere. Residual return fluid below the piston 26 will be dissipated to atmosphere by bleeding through a bleed opening 60 formed between the drive blade 28 and a bumper assembly 62.

Referring now to FIGS. 3-8, an embodiment of a piston assembly employed in the above fastener-driving tool is illustrated where the piston assembly, generally indicated as 70, includes a cylinder or sleeve 18 defining a through-hole 72. As described above, a piston 26 is configured to reciprocally move within the cylinder 18 and has a circular top portion 74 and a driver blade 28 extending from the top portion for driving one or more fasteners into a workpiece. The top portion 74 of the piston 26 is configured to have a size and shape that fits within the through-hole 72 of the cylinder 18. The piston 26 is configured to move between a first position, where the top portion 74 of the piston 26 is at the top end of the cylinder and a second position, where the top portion 74 of the piston 26 is at a bottom end of the cylinder. As shown in FIGS. 7 and 8, the piston 26 moves downwardly through the through-hole 72 in the cylinder 18 so that the driver blade 28 strikes a fastener 32 for driving that fastener into a workpiece. The piston 26 then returns to the top end of the cylinder 18 to repeat this operation.

Figure 3:
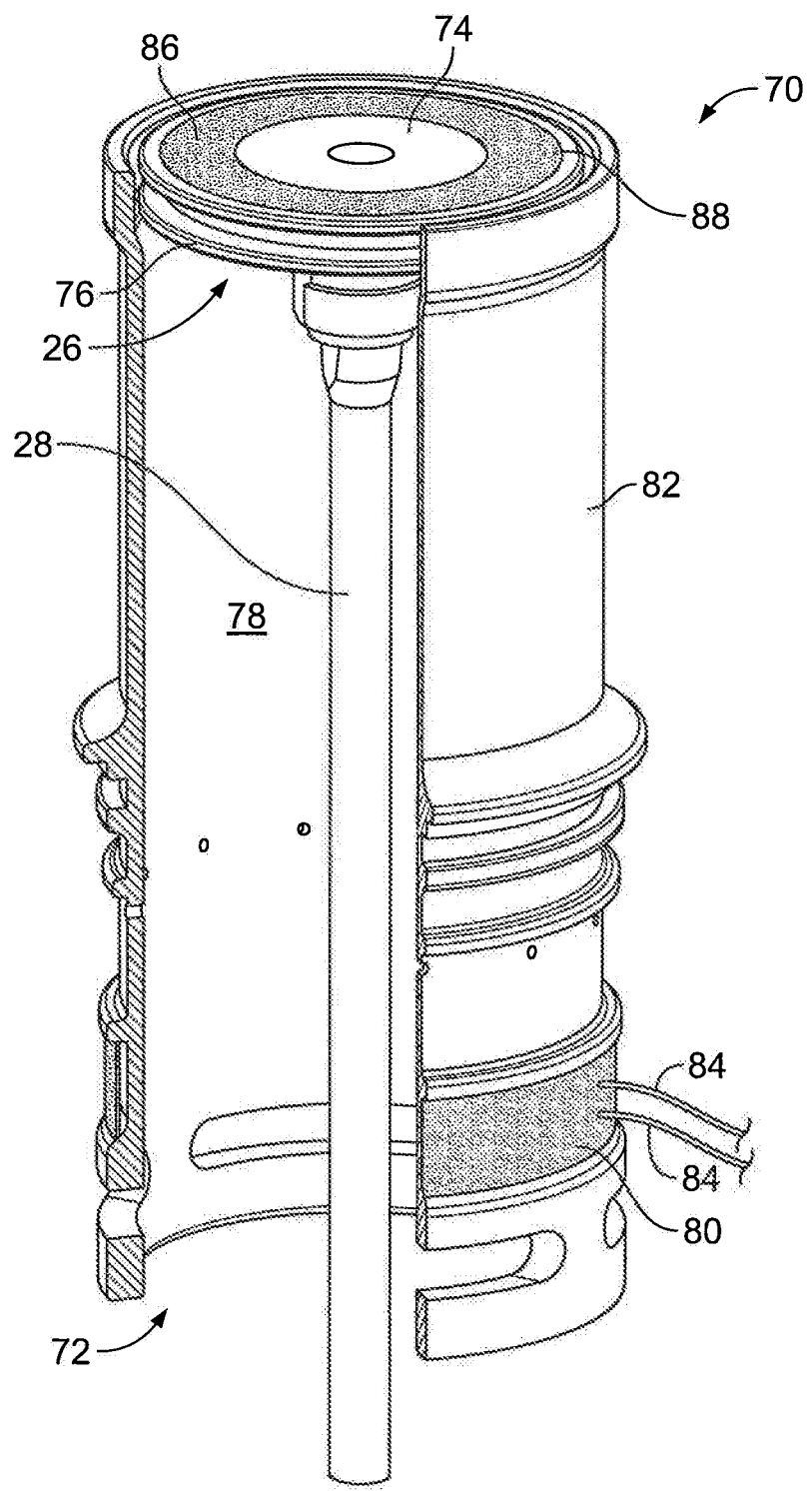
FIG. 3 is a fragmentary perspective view of a piston assembly in the pneumatic fastening tool of FIG. 1.

In various embodiments, one or more sensors or inductors are associated with the cylinder 18. For example, in the illustrated embodiment, the one or more sensors or inductors are located on the cylinder. In the illustrated embodiment, each inductor includes one or a plurality of coils 80 that are wound or wrapped around an outer surface or outer peripheral surface 82 of the cylinder 18 as shown in FIG. 3. The coils 80 are preferably wire coils, such as copper coils, or other suitable conductive metal coils. A pair of electrical wires or cables 84 is attached to the coils 80 for transferring electrical energy or electricity from the coils as will be further described below. The top portion 74 of the piston 26 includes at least one signal generator associated with the piston. In the illustrated embodiment, the signal generator is an annular magnet 86 seated in a corresponding annular recess 88. It should be appreciated that one or a plurality of magnets 86 may be attached to the top portion 74 of the piston 26 and may have any suitable size or shape. It should also be appreciated that the sensor or sensors may be on an inside or outside surface of the cylinder, adjacent to the cylinder or on any suitable part of the tool relative to the cylinder and the piston.

As the piston 26 moves relative to, through or past the wire coils 80, and more specifically, as the signal generator or magnet on the piston moves relative to or past the wire coils, i.e., sensors, electricity is generated by electromagnetic induction. The primary principle behind the generation of electricity in this manner is Faraday's Law. Faraday's Law is a basic law of electromagnetism and states that an induced electromotive force (EMF) in a closed circuit is equal to the time rate of change of the magnetic flux through the circuit. Thus, by attaching the magnet 86 to the piston 26 and the wire coils 80 on the cylinder 18, electrical energy is generated and can be used to power or recharge internal power sources or components of the tool such as indicators (lights, speakers, vibration devices) associated with the operation of the tool. The generated electricity or electrical energy may also be stored for subsequent use in one or more internal batteries or removable and rechargeable batteries. The present piston assembly thereby utilizes the existing moving components of a fastener-driving tool to generate additional electrical energy, which in turn, conserves electrical energy or power stored in the internal tool power sources, such as the internal batteries and the removable and rechargeable main battery.

The amount of electrical energy or electricity generated by the present piston assembly 70 depends on three factors: the number of inductors and/or winds of the coil 80 on the cylinder 18, the strength of the magnetic field generated by the magnet 86 and the speed at which the magnetic field (i.e., the magnet) moves relative to or through the coil or coils 80. Adjusting or varying any one of these factors or more than one of these factors will vary the amount of the generated electricity that can be used to power or recharge one or more the internal batteries in the tool or other power sources. For example, increasing the number of coils on the sleeve will increase the amount of electrical energy or power generated by the present piston assembly. Similarly, increasing the strength of the magnet will increase the electrical energy or power generated by the piston assembly.

Figure 6:
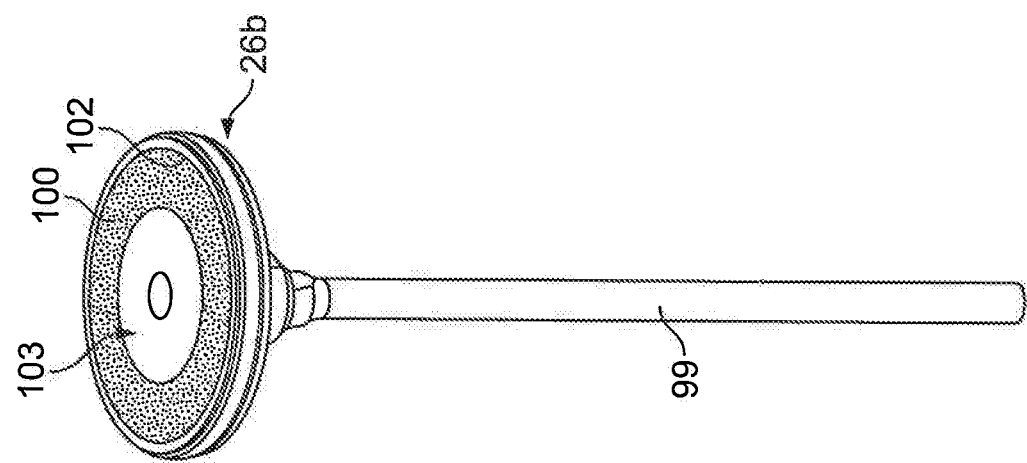
FIG. 6 is a perspective view of another embodiment of the piston in the piston assembly of FIG. 3.
Figure 5:
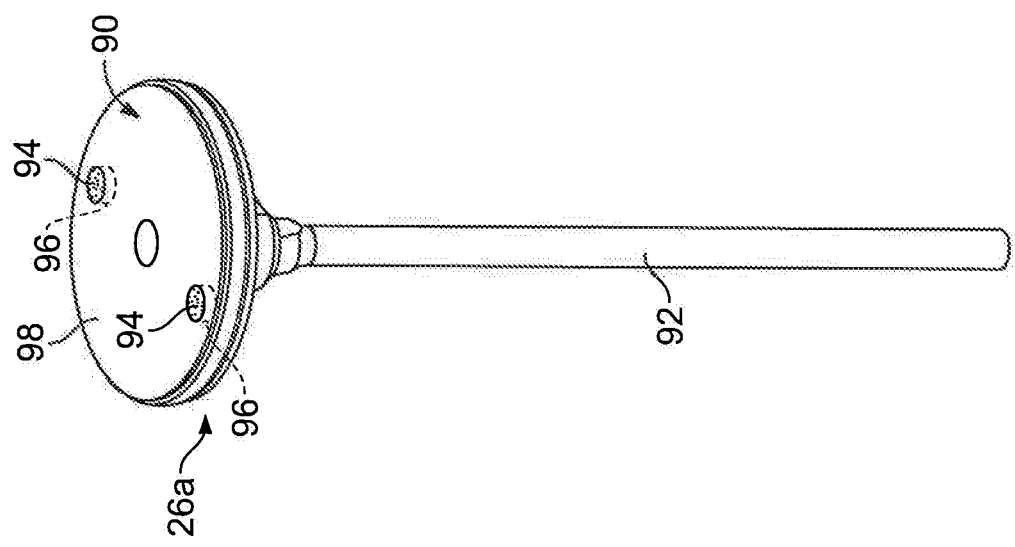
FIG. 5 is a perspective view of an embodiment of the piston in the piston assembly of FIG. 3.
Figure 4:
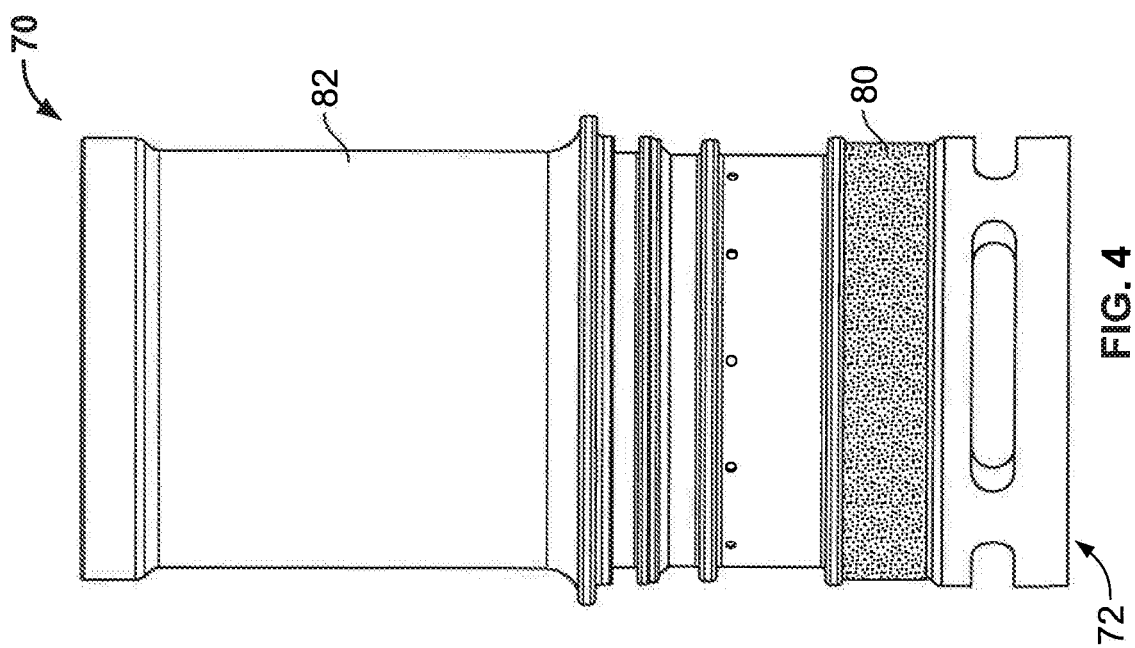
FIG. 4 is an elevation view of the piston assembly of FIG. 3.

FIGS. 5 and 6 show different embodiments of the piston 26. Specifically, FIG. 5 shows an embodiment of the piston 26a having a circular top portion 90 and a driver blade 92 extending from the top portion where two signal generators, such as cylindrical magnets 94, are inserted in corresponding spaced or spaced apart recesses or receptacles 96 defined by a top surface 98 of the top portion 90 of the piston 26a. The magnets 94 may have any suitable size or shape and can be circular, square and the like. Also, FIG. 5 shows a piston having two magnets 94. The piston 26a may have one, two or several magnets 94 attached to the top portion 90 of the piston 26a.

FIG. 6 shows another embodiment of the piston 26b having a driver blade 99 where the magnet 100 is a single annular ring positioned in an annular recess or receptacle 102 and attached to the top portion 103 of the piston 26b. It should be appreciated that the piston 26b may have one or a plurality of annular magnetic rings 100 where the rings are concentric and spaced a predetermined distance from each other.

Referring now to FIGS. 7 and 8, the present piston assembly 70 is illustrated where the top portion 74 of the piston 26 including the magnet 86 begins at a first position at the top of the cylinder 18 and moves to a second position at the bottom of the cylinder where the magnet passes the inductors including metal coils 80 thereby generating electricity that is transferred to one or more internal power sources of the tool by suitable wires or cables 81. As stated above, the amount of electricity generated by the present piston assembly depends on the number of coils 80 on the cylinder 18, the strength and/or the number of magnets 86 on the piston 26, and the speed at which the magnet on the top portion of the piston moves relative to the coils.

Figure 9:
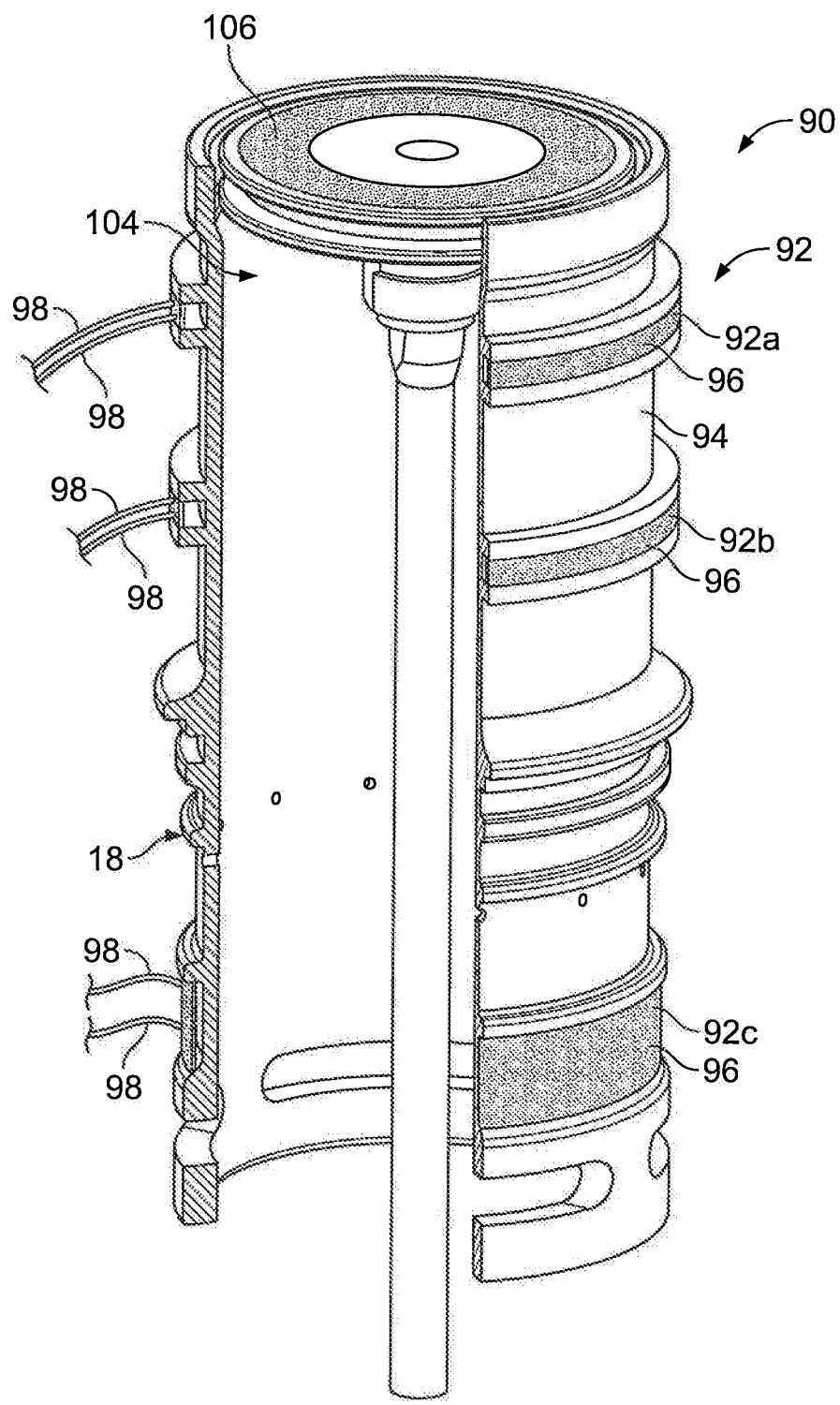
FIG. 9 is a fragmentary perspective view of another embodiment of the piston assembly in the pneumatic fastening tool of FIG. 1.

Referring now to FIG. 9, another embodiment of the piston assembly 90 is illustrated where a plurality of magnetic coil sections 92 on an outer surface 94 of the cylinder 18 each include one or more magnetic coils 96. Specifically, the cylinder 18 includes a first inductor or coil section 92a, a second inductor or coil section 92b and a third inductor or coil section 92c. Each of the first, second and third coil sections 92a, 92b, 92c have two wires or cables 98 connected to the coils 96 in the coil sections 92a, 92b and 92c for providing power to and transmitting power from the coils to other components of the tool. Similar to the piston 100 assembly described above, the piston 104 includes an annular magnet 106 that generates electricity as it passes by each of the first, second and third coil sections 92a, 92b and 92c. The piston assembly 100 thereby generates more electricity than the above embodiment because there are more coils attached to the cylinder 18. It should be appreciated that the cylinder may have one or a plurality of coil sections 92 each including one or more coils 96, and preferably metal coils, for creating electromagnetic induction.

Figure 10:
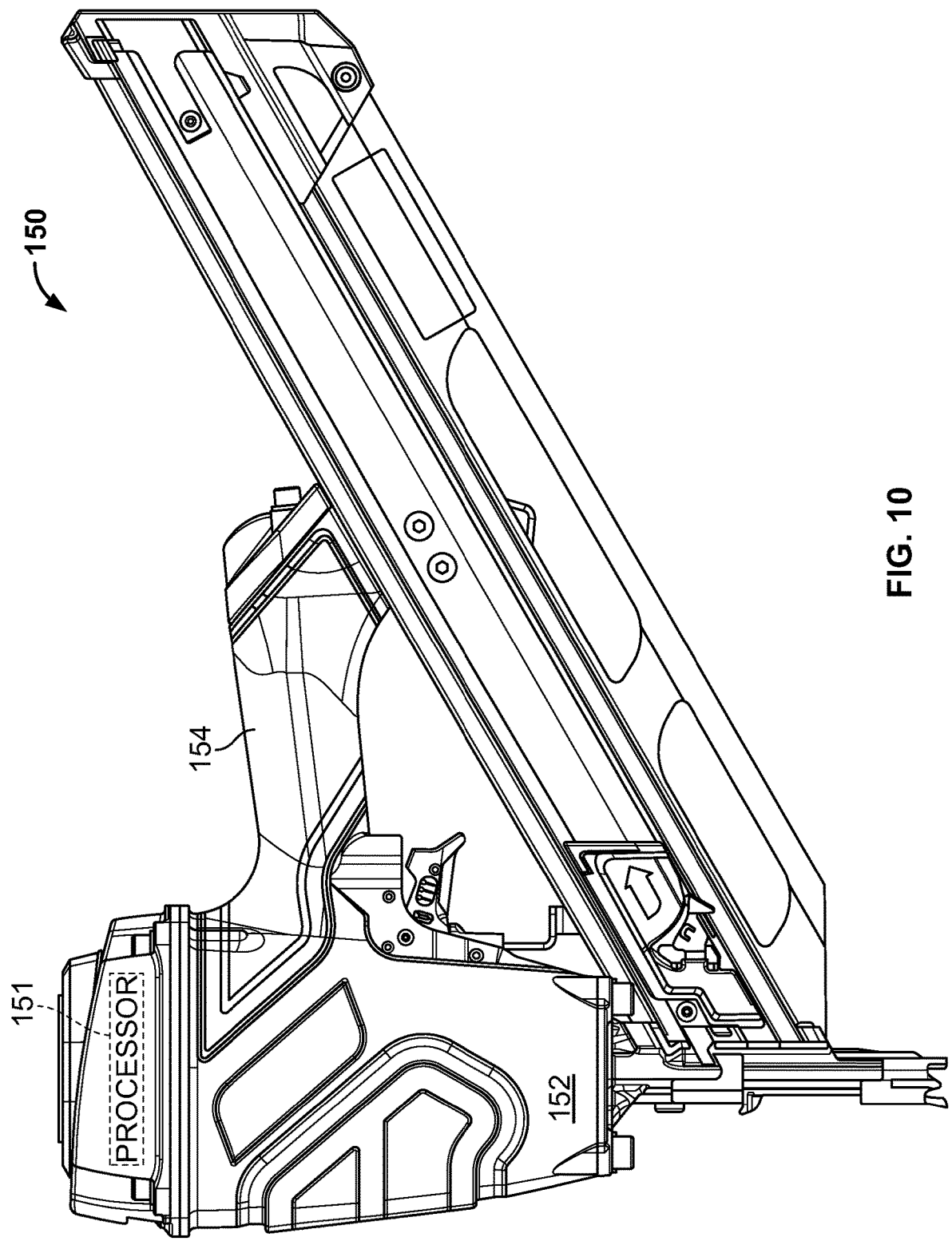
FIG. 10 is a side perspective view of the pneumatic fastening tool in accordance with another example embodiment of the present invention.
Figure 11:
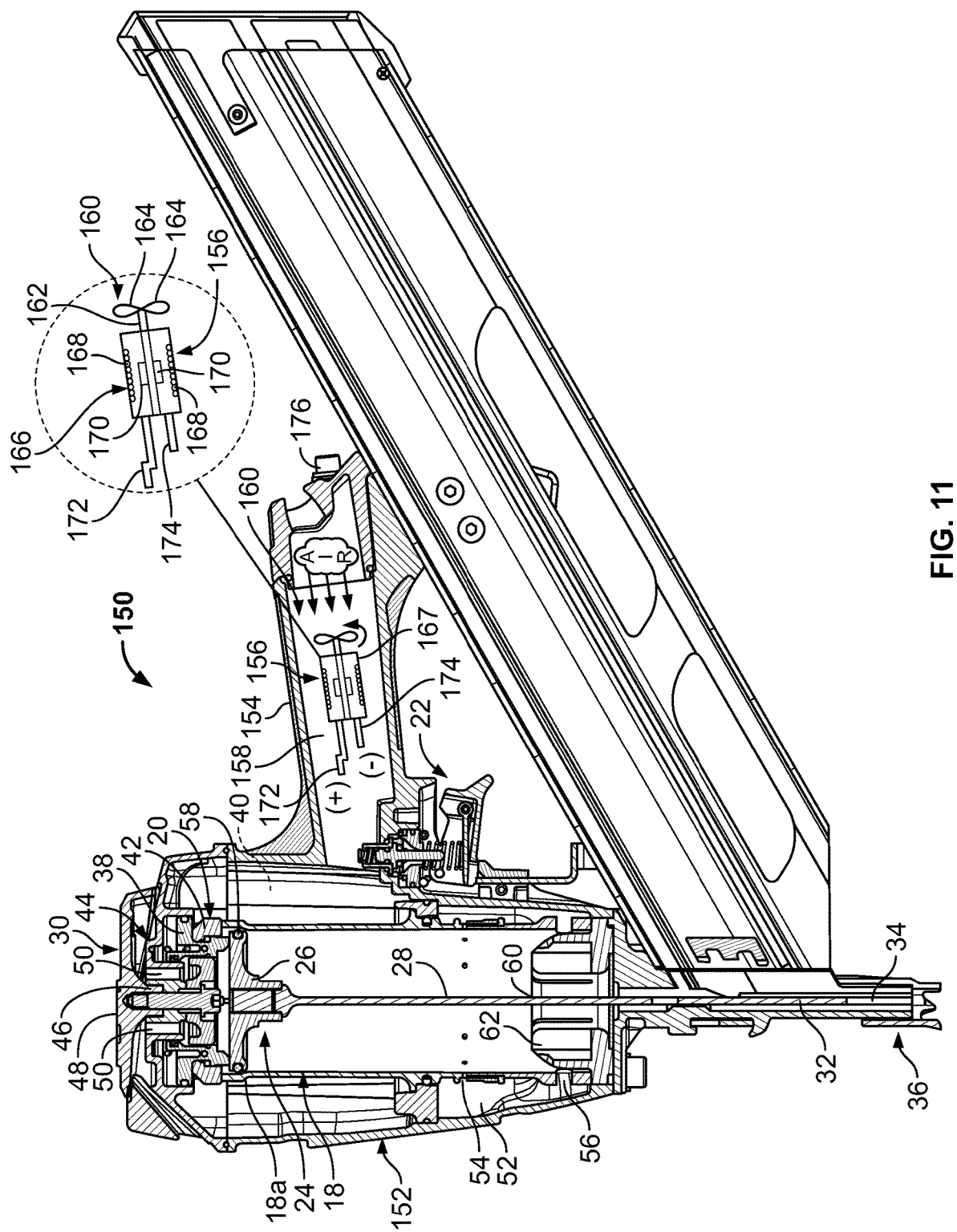
FIG. 11 is a fragmentary side vertical section view of the pneumatic fastening tool of FIG. 10.

Referring now to FIGS. 10 and 11, another example embodiment of the fastener-driving tool of the present disclosure is illustrated where the tool is a pneumatic fastener-driving tool 150 and includes a tool housing 152 having a handle 154 and an electric generator or electric motor assembly 156 mounted in the pneumatic chamber 158 in the handle, where the electric motor assembly 156 utilizes incoming air flow to generate electricity for at least supplementing the available power supply used to power different electrical components of the tool. As shown in FIG. 11, the electric motor assembly 156 includes a fan 160 having a rotor or drive shaft 162 with one or more blades 164 connected to an end of the drive shaft. It should be appreciated that the fan may have a single blade such as a helical-shaped blade or two or more blades as shown in FIG. 11. As the fan 160 rotates in a clockwise or counterclockwise direction, the drive shaft 162 rotates in unison with the fan.

The drive shaft 162 is connected to an electric motor 166 having a housing 167 with magnetic coils 168. An opposing end of the drive shaft 162 includes one or a plurality of magnets 170 which are positioned adjacent to the magnetic coils 168. As the drive shaft 162 rotates, the magnets 170 rotate past the magnetic coils 168 thereby generating an electric current. Alternatively, the drive shaft 162 may include the magnetic coils and the electric motor housing 167 includes the magnets. It should be appreciated that the electric motor assembly may include any suitable electricity generating configuration or scheme. In the illustrated embodiment, the electricity generated by the motor 166 is transferred to the tool 150 by a positive electrical cable or wire 172 and a negative electrical cable or wire 174 connected to the electric motor. It should be appreciated that the generated electricity may be transferred to a battery source, such as a rechargeable battery mounted in the handle 154 or other suitable location in the housing 152, electric devices or components associated with the tool, such as LED indicator lights, or other suitable electrical devices and components of the tool.

In operation, the fan blades 164 on the electric motor assembly 156 are configured to be transverse to the flow direction of the air entering the handle 154 via a pneumatic air connector 176 on the handle. The air may be supplied to the tool by an air compressor, a container including compressed air or other suitable pressurized air sources. As the pressurized air moves through the handle 154 to power the tool 150, the air contacts the fan blades 164 thereby rotating the fan 160 in a clockwise or counterclockwise direction. It should be appreciated that the fan 160 is configured to rotate in one direction but could also be configured to rotate in either the clockwise or counterclockwise direction. In the illustrated embodiment, as the moving air contacts the fan blades 164, the fan 160 rotates, which in turn, rotates the drive shaft 162. As explained above, the rotation of the drive shaft 162 causes the magnet or magnets 170 at the end of drive shaft within the electric motor 166 to rotate adjacent to the magnetic coils 168 thereby generating electricity which is then transferred to a battery storage device and/or electrical components of the tool. It should be appreciated that the tool 150 may include one or a plurality of the electric motor assemblies 156 in the handle 154 for generating electricity. It should also be appreciated that the electric motor assembly 156 may be positioned in any suitable part of the tool housing 152 through which the pressurized air flows.

Figure 12:
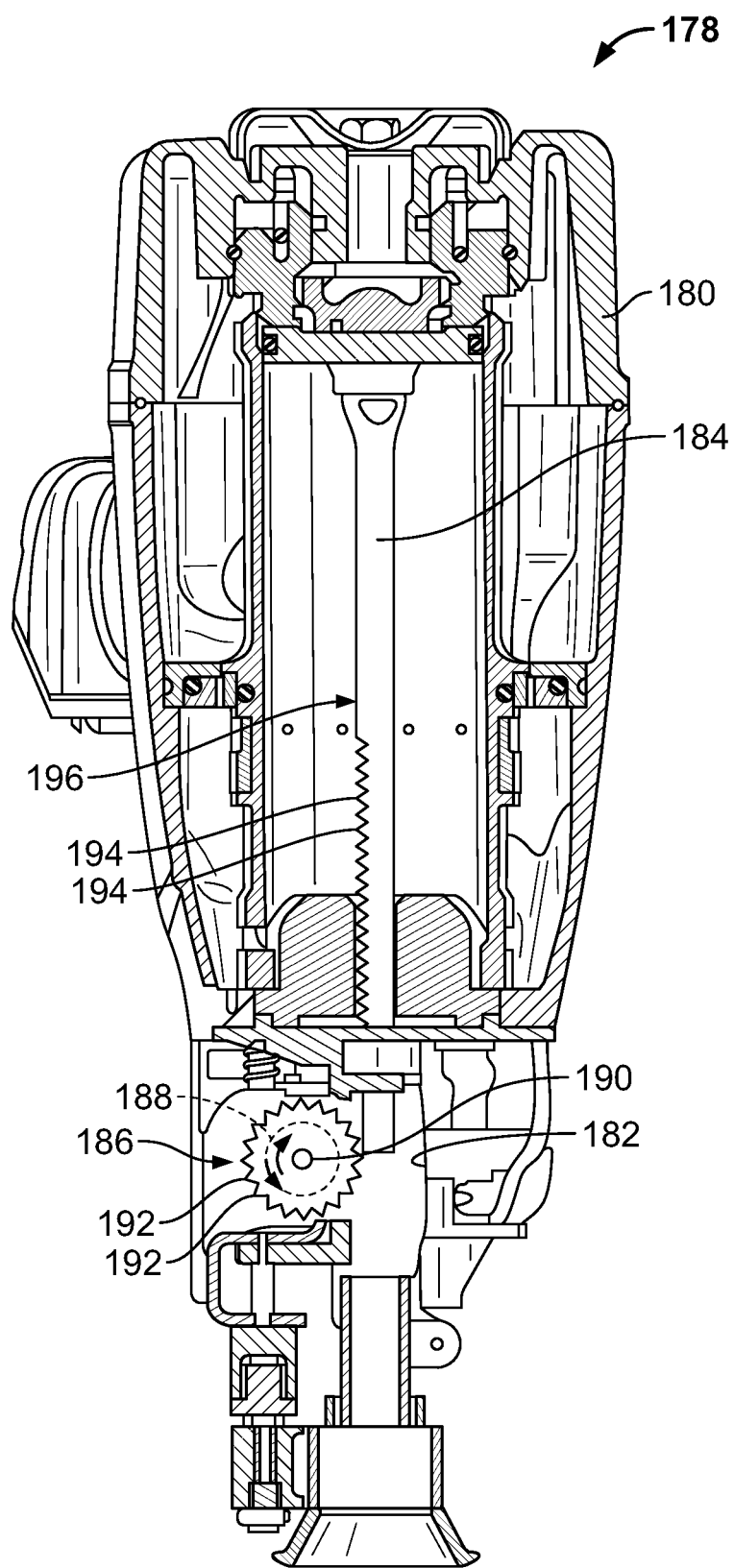
FIG. 12 is a fragmentary front section view of a pneumatic fastening tool in accordance with a further example embodiment of the present invention where the driver blade is in a pre-drive position.
Figure 13:
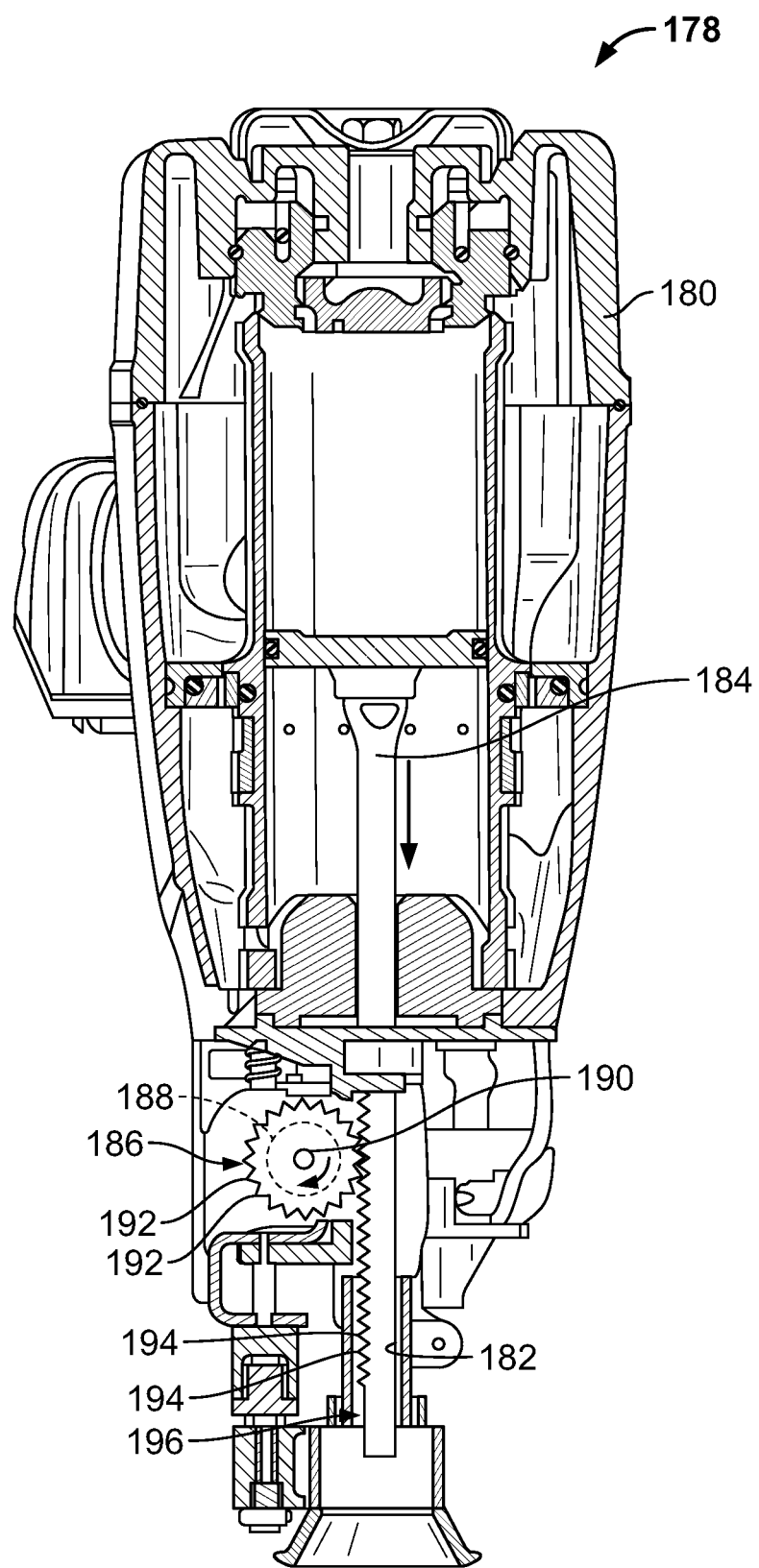
FIG. 13 is a fragmentary front section view of the pneumatic fastening tool of FIG. 12 where the driver blade is in a post-drive position.

Referring now to FIGS. 12 and 13, another embodiment of a fastener-driving tool of the present disclosure is illustrated where the tool 178 includes a tool housing 180 defining a drive channel 182, a driver blade 184 reciprocally movable within the drive channel 182 and a drive gear 186 interconnected with an electric motor 188 via a drive shaft 190. The electric motor 188 may be any suitable electric motor including, but not limited to, the electric motor shown in FIG. 11. In the illustrated embodiment, the drive gear 186 includes a plurality of teeth 192 that engage corresponding teeth 194 on the driver blade 184. As shown in FIG. 12, the drive gear 186 may rotate in a clockwise direction, a counterclockwise direction or in both the clockwise and counterclockwise directions. To ensure that the teeth 192 on the drive gear 196 engage corresponding teeth 194 formed on the driver blade 184, the drive gear 196 is positioned in the tool housing 180 so that at least some of the teeth 192 extend at least partially into the drive channel 182 to engage the teeth 194 on the driver blade 184 as the driver blade moves from a pre-drive position to the post-drive position to drive a fastener into a workpiece.

In operation, when the tool 178 drives a fastener into a workpiece, the driver blade 184 moves from the pre-drive position shown in FIG. 12 to the driven position or post-drive position shown in FIG. 13. As the driver blade 184 moves between these positions, the teeth 194 on a side 196 of the driver blade engage corresponding teeth 192 on the drive gear 186 extending into the drive channel 182 thereby rotating the drive gear in a clockwise direction. It should be appreciated that the teeth 194 on the driver blade 184 and the teeth 192 on the drive gear 186 may initially be disengaged from each other and then engage during at least a portion of the drive stroke and/or the return stroke or be engaged during the entire drive stroke and/or return stroke.

As the drive gear 186 rotates, the drive shaft 190 also rotates as described above thereby causing the electric motor 188 to generate electricity. The generated electricity is transferred to the processor 151 (FIG. 10), an energy storage device, such as a rechargeable battery, or other electrical devices and components of the tool as described above. In this embodiment, the drive gear 186 is associated with a one-way clutch (not shown) such that the drive gear disengages from the electric motor 188 when the driver blade 184 moves from the post-drive position back to the pre-drive position. In this way, electricity is only generated by the electric motor 188 when the driver blade 184 moves through a drive stroke, i.e., from the pre-drive to the post-drive positions, to drive a fastener into a workpiece.

Alternatively, the drive gear 186 is mounted in the housing 180 so that it rotates in both the clockwise and counter clockwise directions to cause the electric motor 188 to generate electricity when the driver blade moves through the drive stroke and also when it moves through the return stroke, i.e., from the post-drive to the pre-drive positions. Enabling electricity to be generated during movement of the driver blade 184 in both directions increases the amount of electricity generated by the electric motor 188, which helps to quickly and efficiently charge the battery and provide power the electric devices and components of the tool 180 such as LED indicator lights. Although FIGS. 12 and 13 show a single drive gear 186, it is contemplated that a plurality of drive gears or a set of planetary gears may be interconnected to the drive blade for generating electricity when the drive blade moves through each drive stroke and return stroke.

Figure 14:
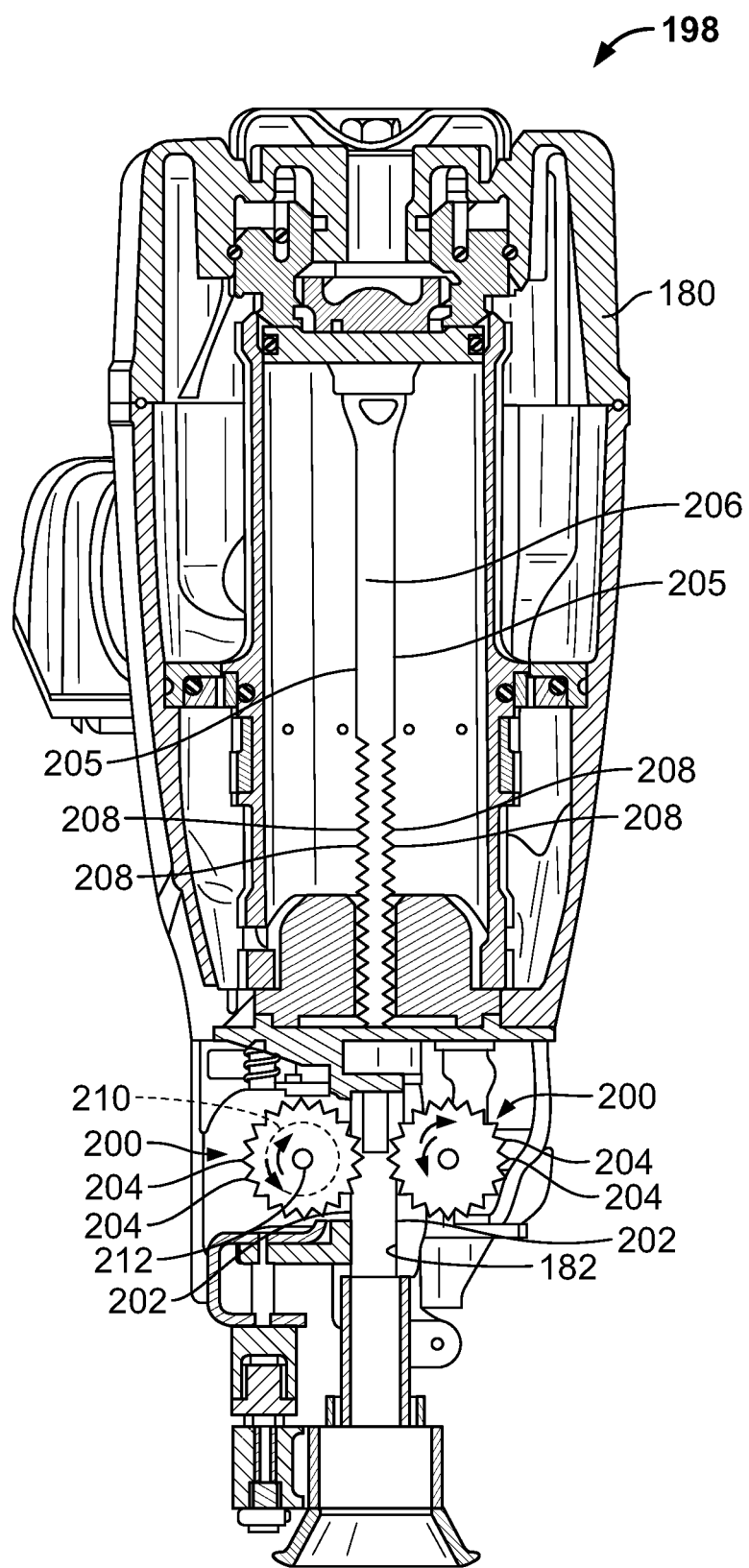
FIG. 14 is a fragmentary front section view of a pneumatic fastening tool in accordance with another example embodiment of the present invention where the driver blade is in a pre-drive position.
Figure 15:
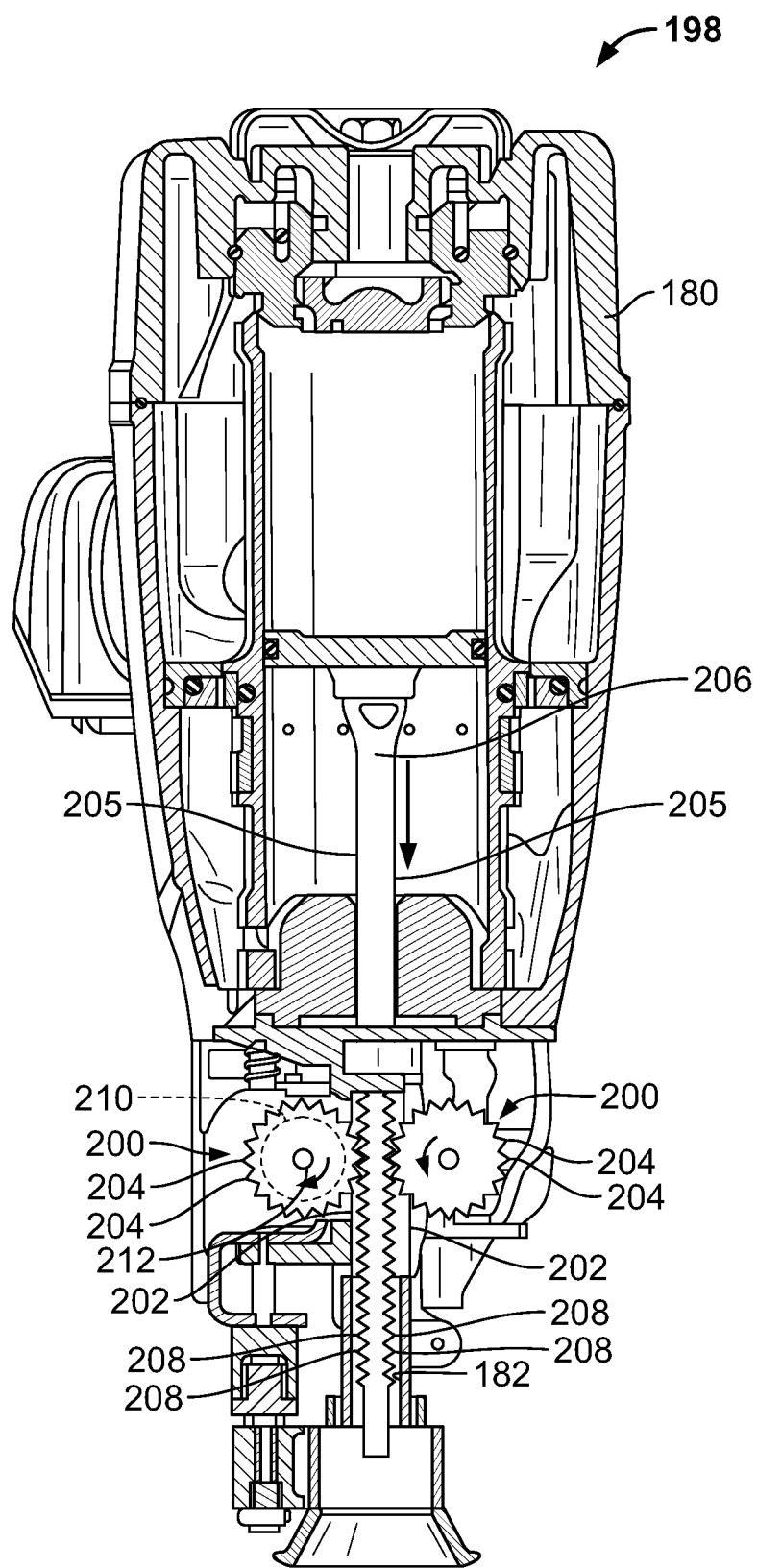
FIG. 15 is a fragmentary front section view of the pneumatic fastening tool of FIG. 14 where the drive blade is in a post-drive position.

Referring now to FIGS. 14 and 15, a further embodiment of a fastener-driving tool of the present disclosure is illustrated where the tool 198 includes two drive gears 200 positioned on opposing sides 202 of the drive channel 182 in the housing 180 where each of the drive gears 200 includes a plurality of teeth 204 that at least partially extend into the drive channel 182. As shown in FIG. 14, each side 205 of driver blade 206 includes teeth 208 that respectfully engage the corresponding teeth 202 of the drive gears 200 as the driver blade 206 moves through the drive channel 182. In FIG. 14, the driver blade 206 is in a pre-drive position where the teeth 208 on the driver blade are not in engagement with the teeth 202 of either of the drive gears 200. It should be appreciated that the teeth 208 and the teeth 202 may be in engagement throughout a portion or the entire drive stroke and/or throughout a portion or the entire return stroke.

In FIG. 15, the driver blade 206 is in a post-drive position after driving a fastener into a workpiece. As the driver blade 206 moves from the pre-drive position to the post-drive position, the teeth 208 on the driver blade correspondingly engage the teeth 208 on the drive gears 200 to respectively rotate the drive gears in the clockwise and counterclockwise directions. In an embodiment, the drive gears 200 are interconnected to a single electric motor 210 by planetary gears or other suitable intermeshing gears. In another embodiment, the tool 198 includes at least two electric motors 210 such that each drive gear 200 is associated with one of the electric motors 210 via a drive shaft 212 such that rotation of the drive gears 200 respectively causes the electric motors 210 to each generate electricity. As discussed above, the drive gears 200 may each include a one-way clutch (not shown) that only enables the drive gears 200 to rotate the respective drive shafts when the driver blade 206 is moving through a drive stroke. Alternatively, the drive gears 200 may each rotate in both directions thereby causing the electric motors 210 to generate electricity when the driver blade 205 moves through both the drive stroke and the return stroke.

The above embodiments are directed to fastener-driving tools, such as pneumatic-powered fastener tools or pneumatic nailers. It should be appreciated that the present invention may be used in combustion-powered fastener-driving tools and other suitable powered-fastening tools.

While particular embodiments of a fastener-driving tool have been described herein, it will be appreciated by those skilled in the art that changes and modifications may be made thereto without departing from the invention in its broader aspects and as set forth in the following claims.

The invention claimed is:

1. A fastener-driving tool comprising:
a housing defining a drive channel;
a driver blade movable within the drive channel between a first position and a second position, the driver blade comprising multiple driver blade teeth;
a gear rotatably mounted within the housing and positioned relative to the drive channel such that the driver blade teeth drivingly engage the gear to cause the gear to rotate in a first direction when the driver blade moves from the first position to the second position; and
a second gear rotatably mounted within the housing and positioned relative to the drive channel such that the driver blade teeth drivingly engage the second gear to cause the second gear to rotate when the driver blade moves from the first position to the second position.

2. The fastener-driving tool of claim 1, wherein the first position is a pre-drive position and the second position is a post-drive position.

3. The fastener-driving tool of claim 1, further comprising an electricity generator, wherein the gear is coupled to the electricity generator such that rotation of the gear in the first direction causes the electricity generator to generate electricity.

4. The fastener-driving tool of claim 3, further comprising a drive shaft, wherein the gear is coupled to the electricity generator via the drive shaft.

5. The fastener-driving tool of claim 3, further comprising an electrical component, wherein the electricity generator is electrically connected to the electrical component to direct the generated electricity to the electrical component.

6. The fastener-driving tool of claim 5, wherein the electrical component comprises a power storage device.

7. The fastener-driving tool of claim 3, wherein the electricity generator comprises an electric motor.

8. The fastener-driving tool of claim 3, wherein the gear is positioned relative to the drive channel such that the driver blade teeth drivingly engage the gear to cause the gear to rotate in a second direction different from the first direction when the driver blade moves from the second position to the first position.

9. The fastener-driving tool of claim 1, wherein the gear and the second gear are positioned relative to the drive channel such that the driver blade teeth drivingly engage the gear and the second gear to cause the gear and the second gear to rotate in different directions when the driver blade moves from the first position to the second position.

10. The fastener-driving tool of claim 1, further comprising an electricity generator electrically connected to an electrical component, wherein the gear and the second gear are coupled to the electricity generator such that rotation of the gear and rotation of the second gear cause the electricity generator to generate electricity, and wherein the electricity generator is configured to direct the generated electricity to the electrical component.

11. The fastener-driving tool of claim 1, further comprising a first electricity generator, a second electricity generator, and an electrical component electrically connected to the first and second electricity generators, wherein the gear is coupled to the first electricity generator such that rotation of the gear causes the first electricity generator to generate electricity, wherein the second gear is coupled to the second electricity generator such that rotation of the second gear causes the second electricity generator to generate electricity, and wherein the first and second electricity generators are configured to direct the generated electricity to the electrical component.

12. A fastener-driving tool comprising:
a housing;
a cylinder within the housing;
a driving assembly comprising a piston within the cylinder and a toothed driver blade attached to the piston, wherein the driving assembly is movable relative to the cylinder between a first position and a second position;
a toothed component positioned relative to the driving assembly such that the toothed driver blade drivingly engages the toothed component to move the toothed component when the toothed driver blade moves from the first position to the second position;
an electricity generator coupled to the toothed component such that movement of the toothed component causes the electricity generator to generate electricity; and
an electrical component electrically connected to the electricity generator to receive the electricity generated by the electricity generator.

13. The fastener-driving tool of claim 12, wherein the first position is a pre-drive position and the second position is a post-drive position.

14. The fastener-driving tool of claim 12, wherein the electrical component comprises a power storage device.

15. The fastener-driving tool of claim 12, wherein the electricity generator comprises an electric motor.

16. A fastener-driving tool comprising:
a housing;
a first toothed component movable relative to the housing between a first position and a second position;
a second toothed component positioned relative to the first toothed component such that the first toothed component drivingly engages the second toothed component to move the second toothed component when the first toothed component moves from the first position to the second position;

an electricity generator coupled to the second toothed component such that movement of the second toothed component causes the electricity generator to generate electricity; and an electrical component electrically connected to the electricity generator to receive the electricity generated by the electricity generator.

17. The fastener-driving tool of claim 16, wherein the first toothed component comprises a toothed driver blade.

18. The fastener-driving tool of claim 17, wherein the second toothed component comprises a gear.

19. The fastener-driving tool of claim 18, wherein the first position is a pre-drive position and the second position is a post-drive position.

* * * * *